(12) United States Patent
Shaouy

(10) Patent No.: US 9,984,343 B2
(45) Date of Patent: *May 29, 2018

(54) SYSTEM AND METHOD FOR PROVIDING AUTOMATIC TASK ASSIGNMENT AND NOTIFICATION

(71) Applicant: INTERNATIONAL BUSINESS MACHINES CORPORATION, Armonk, NY (US)

(72) Inventor: William P. Shaouy, Atlanta, GA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/012,375

(22) Filed: Feb. 1, 2016

(65) Prior Publication Data

US 2016/0148145 A1 May 26, 2016

Related U.S. Application Data

(63) Continuation of application No. 11/849,738, filed on Sep. 4, 2007.

(51) Int. Cl.
*G06Q 10/06* (2012.01)
*G06Q 10/10* (2012.01)

(52) U.S. Cl.
CPC ..... *G06Q 10/063112* (2013.01); *G06Q 10/06* (2013.01); *G06Q 10/063116* (2013.01); *G06Q 10/063118* (2013.01); *G06Q 10/1097* (2013.01)

(58) Field of Classification Search
None
See application file for complete search history.

(56) References Cited

U.S. PATENT DOCUMENTS

| | | | |
|---|---|---|---|
| 5,012,409 | A | 4/1991 | Fletcher et al. |
| 5,111,391 | A | 5/1992 | Fields et al. |
| 5,117,353 | A | 5/1992 | Stipanovich et al. |
| 5,278,976 | A | 1/1994 | Wu |
| 5,826,239 | A | 10/1998 | Du et al. |

(Continued)

OTHER PUBLICATIONS

Notice of Allowance dated Dec. 20, 2017 in related U.S. Appl. No. 11/849,738, 8 pages.

*Primary Examiner* — Johnna R Loftis
*Assistant Examiner* — Alan Torrico-Lopez
(74) *Attorney, Agent, or Firm* — Isaac Gooshaw; Andrew M. Calderon; Roberts Mlotkowski Safran Cole & Calderon, P.C.

(57) ABSTRACT

A system and method of managing and prioritizing tasks amongst resources and, more particularly, to a system and method for providing automatic task assignment and notification amongst globally dispersed human resources. The system includes a change of management application configured to store a list of tasks and a task notifier configured to retrieve a list of geographically-dispersed resources and notify selected ones of the geographically-dispersed resources of a priority of completion of one or more tasks retrieved from the change of management application. The system further includes a message application configured to be polled by the task notifier to determine which of the geographically dispersed resources is online or currently working.

15 Claims, 3 Drawing Sheets

(56) References Cited

U.S. PATENT DOCUMENTS

| | | |
|---|---|---|
| 5,960,404 A | 9/1999 | Chaar et al. |
| 6,101,481 A | 8/2000 | Miller |
| 6,308,163 B1 | 10/2001 | Du et al. |
| 6,415,259 B1 | 7/2002 | Wolfinger et al. |
| 6,445,968 B1 | 9/2002 | Jalla |
| 6,810,383 B1 | 10/2004 | Loveland |
| 6,868,413 B1 | 3/2005 | Grindrod et al. |
| 7,071,041 B2 | 7/2006 | Yamazaki et al. |
| 7,155,400 B1 | 12/2006 | Jilk et al. |
| 7,263,183 B1 * | 8/2007 | Klein ............... H04M 3/42374 379/265.09 |
| 7,330,822 B1 | 2/2008 | Robson et al. |
| 7,406,515 B1 | 7/2008 | Joyce et al. |
| 7,769,617 B2 | 8/2010 | Iwasaki et al. |
| 7,774,742 B2 | 8/2010 | Gupta et al. |
| 7,870,535 B2 | 1/2011 | Rippert et al. |
| 2002/0029161 A1 | 3/2002 | Brodersen et al. |
| 2003/0009530 A1 | 1/2003 | Philonenko et al. |
| 2003/0028410 A1 | 2/2003 | House et al. |
| 2003/0149598 A1 | 8/2003 | Santoso et al. |
| 2003/0158745 A1 | 8/2003 | Katz et al. |
| 2004/0030992 A1 | 2/2004 | Moisa et al. |
| 2004/0093351 A1 | 5/2004 | Lee et al. |
| 2004/0111313 A1 | 6/2004 | Ingman et al. |
| 2004/0117759 A1 | 6/2004 | Rippert et al. |
| 2004/0138939 A1 | 7/2004 | Theiler |
| 2004/0153354 A1 | 8/2004 | Nonaka et al. |
| 2004/0268349 A1 | 12/2004 | Ramakrishnan et al. |
| 2005/0027578 A1 | 2/2005 | Chambers et al. |
| 2005/0049973 A1 | 3/2005 | Read et al. |
| 2005/0055697 A1 | 3/2005 | Buco et al. |
| 2005/0071426 A1 | 3/2005 | Shah et al. |
| 2005/0209902 A1 * | 9/2005 | Iwasaki ............ G06Q 10/06311 705/7.26 |
| 2005/0229151 A1 | 10/2005 | Gupta et al. |
| 2006/0053043 A1 | 3/2006 | Clarke |
| 2006/0070020 A1 | 3/2006 | Puttaswamy et al. |
| 2006/0112371 A1 | 5/2006 | Oikawa et al. |
| 2006/0173785 A1 | 8/2006 | Behbehani |
| 2006/0277547 A1 | 12/2006 | Abe |
| 2007/0100981 A1 | 5/2007 | Adamczyk et al. |
| 2008/0313024 A1 | 12/2008 | Kunichika et al. |
| 2009/0112677 A1 | 4/2009 | Rhett |

* cited by examiner

SYSTEM AND METHOD FOR PROVIDING AUTOMATIC TASK ASSIGNMENT AND NOTIFICATION

FIELD OF THE INVENTION

The invention generally relates to a system and method of managing and prioritizing tasks amongst resources and, more particularly, to a system and method for providing automatic task assignment and notification amongst globally dispersed human resources.

BACKGROUND OF THE INVENTION

Global developments, both technological and economic, have led many organizations to diversify their workforce throughout the world. For example, technology such as computer networking has made it feasible for companies or other organizations to employee people regardless of geographic boundaries. That is, technologies have allowed employees to be increasingly dispersed in time, place, and organizational affiliation. In this way, as labor markets are becoming tighter and supply-driven, it is possible to find more qualified personnel, without the need to have a physical facility at such locations.

However, becoming ever more dispersed, both technologically as well as geographically, poses significant challenges to management. By way of example, it becomes increasingly more difficult for management to coordinate workflow and assignments for projects. This is a significant challenge when employees dispersed amongst different locations are assigned to a single project. This is even more challenging when these employees (team members) are dispersed amongst different time zones, some being 12 or more hours different.

A project manager is tasked with the coordination of the project by first assembling a team and then assigning the team members specific tasks that need to be accomplished to complete the project. This includes assessing the skill set and level of skill of all team members, the time that each team member is projected to work, the sequence of tasks that are required to complete the task, etc. As such, the project manager is thus tasked with leading the planning and the development of all project deliverables. The project manager is also thus responsible for managing the budget and work plan and all project management procedures such as, for example, scope management, issues management, risk management, etc.

Thus, as can be imagined, a project team dispersed amongst many different time zones has many challenges to overcome in performing their work. This includes the coordination and collaboration of projects, amongst themselves, and the coordination and assignment of workflow by the project manager. The latter of which becomes very problematic when a project requires certain tasks to be performed in a specific sequence. So, for example, it is the responsibility of the project manager to ensure that a team member work and complete a first task, in an earlier time zone, prior to another team member undertaking a subsequently required task in a later time zone.

It is also important for the project manager to communicate the specific tasks that require completion, and their time frame for completion, amongst all of the team members. But this becomes problematic when certain team members, in different time zones, are not currently working since their workday has ended or not yet started.

Accordingly, there exists a need in the art to overcome the deficiencies and limitations described hereinabove.

SUMMARY OF THE INVENTION

In a first aspect of the invention, a system comprises a change of management application configured to store a list of tasks and a task notifier configured to retrieve a list of geographically-dispersed resources and notify selected ones of the geographically-dispersed resources of a priority of completion of one or more tasks retrieved from the change of management application. The system further includes a message application configured to be polled by the task notifier to determine which of the geographically dispersed resources is at least one of online and currently working.

In another aspect of the invention, a method for prioritizing tasks comprises providing a computer infrastructure being operable to: store a list of tasks, geographically-dispersed resources and skills; and retrieve the geographically-dispersed resources which match with the skills of retrieved tasks and notify selected ones of the geographically-dispersed resources of a priority of completion of the retrieved tasks.

In another aspect of the invention, a method comprises polling a list of geographically dispersed resources to determine which geographically dispersed resources are online and/or currently working. The method further includes retrieving a latest list of tasks whose required skills is not null and prioritizing each of the retrieved tasks for selected ones of the geographically dispersed resources.

In another aspect of the invention, a computer program product comprising a computer usable medium having readable program code embodied in the medium is provided. The computer program product includes at least one component to perform the functions of the computer infrastructure.

DETAILED DESCRIPTION OF EMBODIMENTS OF THE INVENTION

The invention generally relates to a system and method of managing and prioritizing tasks amongst resources and, more particularly, to a system and method for providing automatic task assignment and notification amongst globally dispersed human resources. More specifically, in embodiments, the system and method of the invention contemplates an architecture that performs functions of a project manager. For example, in one aspect of the invention, the system and method is configured to automatically prioritize tasks for human resources globally dispersed among time zones, and notify those human resources, e.g., team members, that they "own" new tasks. The need for this capability has become greater with the advent of globally dispersed project teams.

The advantage of virtual project teams, which are coordinated and prioritized by the automatic task assignment and notification method and system, is diverse. For example, the system and method of the invention provides flexibility to bring together members from diverse contexts for short and long term endeavors. The system and method of the invention also bridges many contrasting requirements, especially the transferability of knowledge to and from the project.

System Environment

Figure 1:
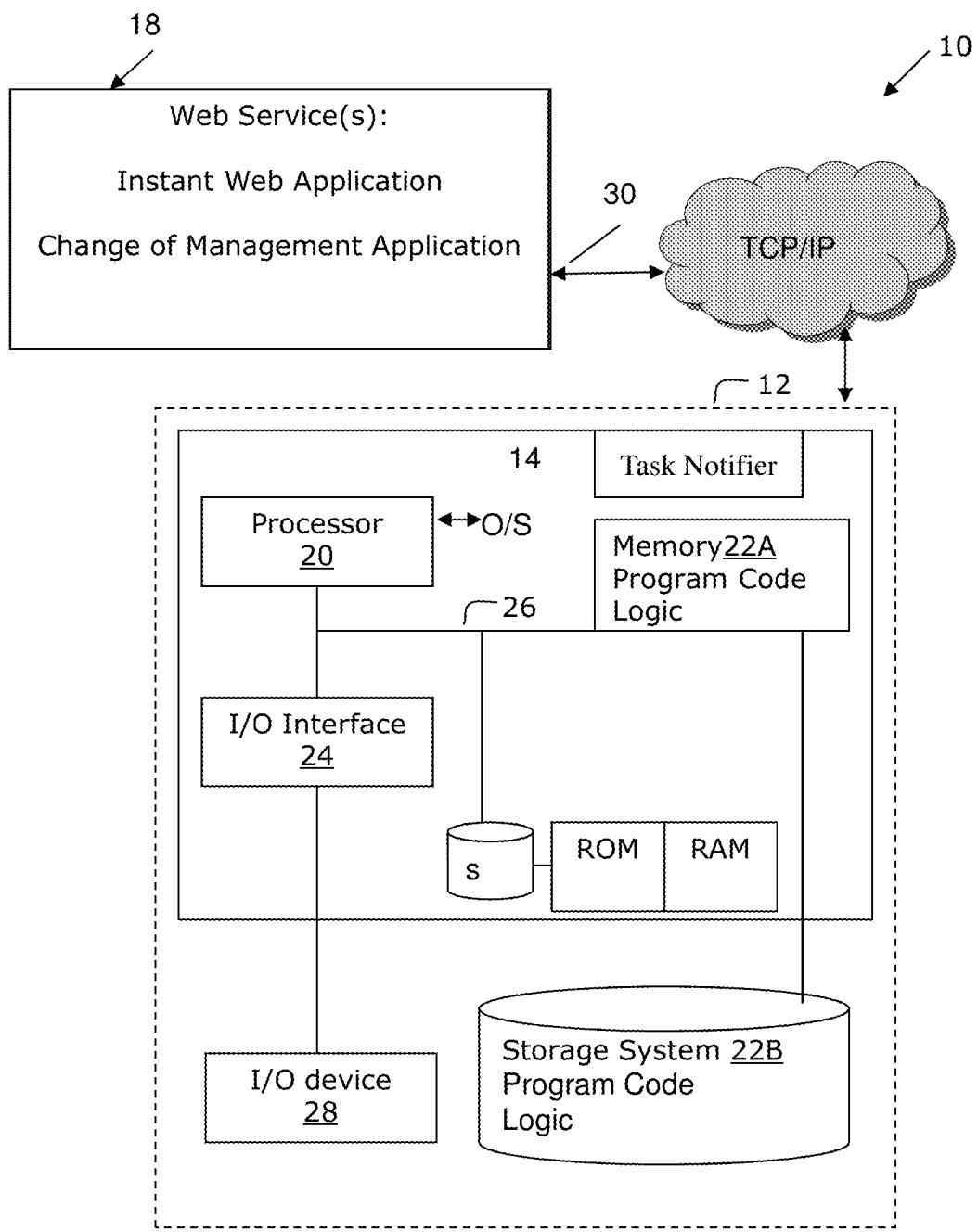
FIG. 1 shows an illustrative environment in accordance with the invention.

FIG. 1 shows an illustrative environment 10 for managing the processes in accordance with the invention. The illustrative environment may be a server or a user workstation, for example. The environment 10 includes a computer infrastructure 12 having a computing device 14 (e.g., including a Task Notifier). More specifically, the computing device 14 includes a Task Notifier that performs several functions including, for example, retrieving a list of geographically-dispersed resources from a Resources Table stored in storage 22B, e.g., Task-Resource Database. In embodiments, the Task-Resource Database 22B contains very little information, and is used as a pointer to other storage areas. This makes the Task-Resource Database very flexible and lightweight.

In embodiments, the Task Notifier is configured to poll an Instant Message Application (or other application) through a web service interface 18 to determine which geographically dispersed resources are online and/or are currently working. The web service interface 18 may also interface with a Change of Management Application, as discussed below. In addition, the Task Notifier is configured to retrieve the latest list of tasks from a Tasks Table, as well as skills of team members from the Resources Table, both of which may be stored in the Resource Database 22B. In embodiments, using the information obtained in or from the Resource Database 22B, the Task Notifier is capable of matching and prioritizing tasks, amongst globally dispersed team members (also referred to as geographically dispersed resources) in the absence of a project manager and/or tech leader.

In embodiments, the Task Notifier includes executable code, which may be stored temporarily or permanently in a memory 22A. The executable code may be used to prioritize tasks and notify resources (e.g., team members) of the prioritized tasks. The executable code, e.g., program code, may implement a rules engine that uses programmable business logic to prioritize the tasks and notify the team members about the tasks they are assigned, as assisted by the Task-Resource Database 22B.

Still referring to FIG. 1, the memory 22A can include local memory employed during actual execution of program code, bulk storage, and cache memories which provide temporary storage of at least some program code in order to reduce the number of times code must be retrieved from bulk storage during execution. The computer infrastructure 12 further includes a processor 20, an input/output (I/O) interface 24, a bus 26, Storage "S", ROM, RAM and an external I/O device/resource 28.

The computer infrastructure 12 also includes an operating system O/S, which may be any operating system. The external I/O device/resource 28 may be a keyboard, display, pointing device, or any device that enables the computer infrastructure 12 to communicate with one or more other computing devices using any type of communications link 30. The communications link 30 can be, for example, wired and/or wireless links; one or more types of networks (e.g., the Internet, a wide area network, a local area network, a virtual private network, etc.); and/or any known transmission techniques and protocols such as, for example, TCP/IP.

The processor 20 executes the computer program code and logic of the system and method of the invention, e.g., the Task Notifier, which is stored in the memory 22A. While executing the computer program code, etc., the processor 20 can read and/or write data to/from the memory 22A, storage system 22B, and/or I/O interface 24. The bus 26 provides a communications link between each of the components in the computing device 14.

Architecture of Embodiments of the Invention

Figure 2:
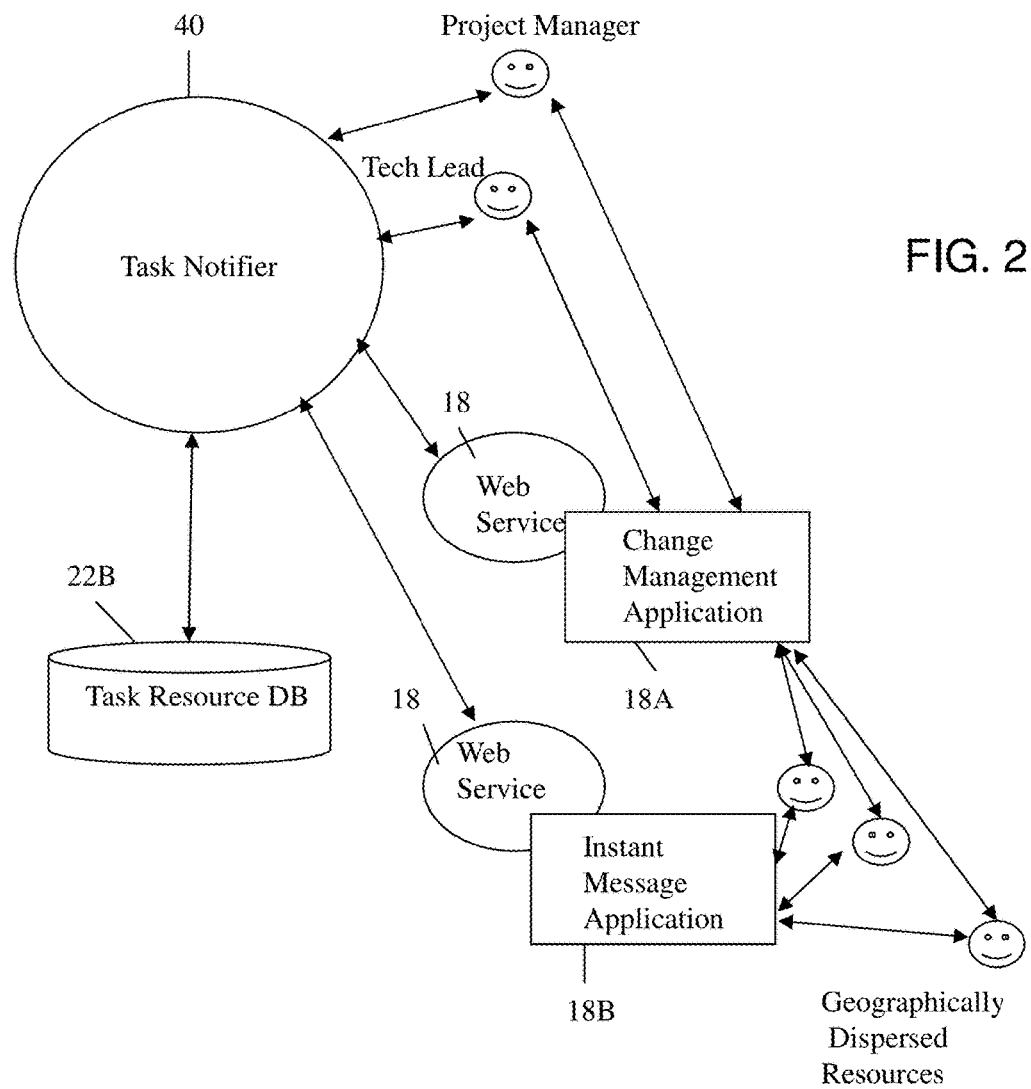
FIG. 2 shows an architecture in accordance with an aspect of the invention.

FIG. 2 shows an architecture in accordance with an aspect of the invention. More specifically, the architecture includes a Task Notifier 40 which is a component containing a rules engine that uses programmable business logic to prioritize tasks and notify team members about the assigned tasks. In embodiments, the Task Notifier 40 acts as a project manager.

The Task Notifier 40 retrieves information from the Task-Resource Database 22B, including tasks, pointers to team members, skills required for the tasks and skills of team members, amongst other features. The Task-Resource Database 22B contains the Tasks Table and Resources Table, which provide the pertinent information to the Task Notifier 40. The tables may be in column format as shown below.

| Tasks Table | |
| --- | --- |
| Task ID | string |
| Priority | integer |
| Required Skills | comma-delineated string of skills |

| Resources Table | |
| --- | --- |
| Name of team member | string |
| Change Management Application User ID | string |
| Instant Message Application User ID (or other ID, e.g., email, facsimile, etc.) | string |
| Skills of Team Members | comma-delineated string of skills |

The Tasks Table, in one illustrative implementation, includes a Task ID (e.g., in the form of a string), Priority (e.g., in the form of an integer) and Required Skills (e.g., in the form of a comma-delineated string). By way of one non-limiting example, the Task ID may be a pointer pointing to a "Change of Management Application." The Priority may be any integer, for example, which designates a priority of a specific task. The required skills include one or a set of skills, which are required for a specific task, e.g., JAVA, XML, etc.

The Resources Table, on the other hand, includes, for example, names of team members (e.g., in the form of a string), a "Change Management Application User ID" (e.g., in the form of a string), an "Instant Message Application User ID" or other type of ID (e.g., in the form of a string) and a list of skills of each team member (e.g., in the form of a comma-delineated string). By way of one non-limiting example, the "Change Management Application User ID" may be a user ID to gain access to the Change Management Application. The "Instant Message Application User ID" may be a user ID to gain access to the Instant Message Application. In other embodiments, the User ID may be associated with other types of applications such as, for example, email applications. The skills are a list of one or more skills of team member(s) (e.g., JAVA, XML, etc.), which may be populated by the team members, tech leader or other person(s) familiar with the skills of the team members.

Still referring to FIG. 2, a Project Manager (or equivalent) creates or modifies tasks in a Change Management Application (e.g., Clearquest®) 18A. (Clearquest is a registered trademark of IBM Corporation, in the U.S. and throughout the world.) Clearquest® provides a robust Configuration Management and Change Request Management solutions for the administration of tasks.

The Project Manager may assign a priority score (some tools use the term "severity") on a numerical or other scale, e.g., 1 through 4 for each task (often expressed as a "feature" or "defect"). In embodiments, all tasks reside in the Change Management Application 18A.

Additionally, the Project Manager is in communication with the Task Notifier 40, which, amongst other features, allows the Project Manager to notify the Task Notifier 40 of his/her absence. The Project Manager (or equivalent) may modify or add tasks in the Change Management Application 18A, via an optional web service.

In embodiments, a low-priority thread of the Task Notifier 40 uses an infinite loop to poll the Change Management Application 18A for its latest list of tasks which are yet to be started. If any unstarted task does not have a corresponding task in the Tasks Table of the Task-Resource Database 22B, the Task Notifier 40 is configured to add rows for those tasks in the Tasks Table. Then, for each of these rows, the Task Notifier 40 sends an instant message and/or email (or other notification) to the Tech Lead prompting the Tech Lead (or other user) to complete the "Required Skills" column in the Tasks Table, for each notified task. The Tech Lead may receive the modified or new tasks from the Change Management Application 18A via a web service.

In further embodiments, geographically dispersed team members (e.g., resources) will receive new or modified tasks and corresponding priorities for such tasks from the Task Notifier 40, via an Instant Message Application 18B. A web service may be an interface between the Instant Message Application 18B and the Task Notifier 40. In further embodiments, the system and method of the invention contemplates that the Task Notifier 40 may notify the geographically dispersed team member of the modified or new tasks (and priorities thereof), via other mechanisms such as email or facsimile, to name a few.

The team members may also provide their skills by populating the "skills" column in the Resources Table. In further embodiments, the Tech Lead may populate the "skills" column in the Resources Table, with the skills of each team member. Once notified of the new task, the team members may retrieve the assigned tasks from the Change Management Application 18A.

Example of Operation

Figure 3:
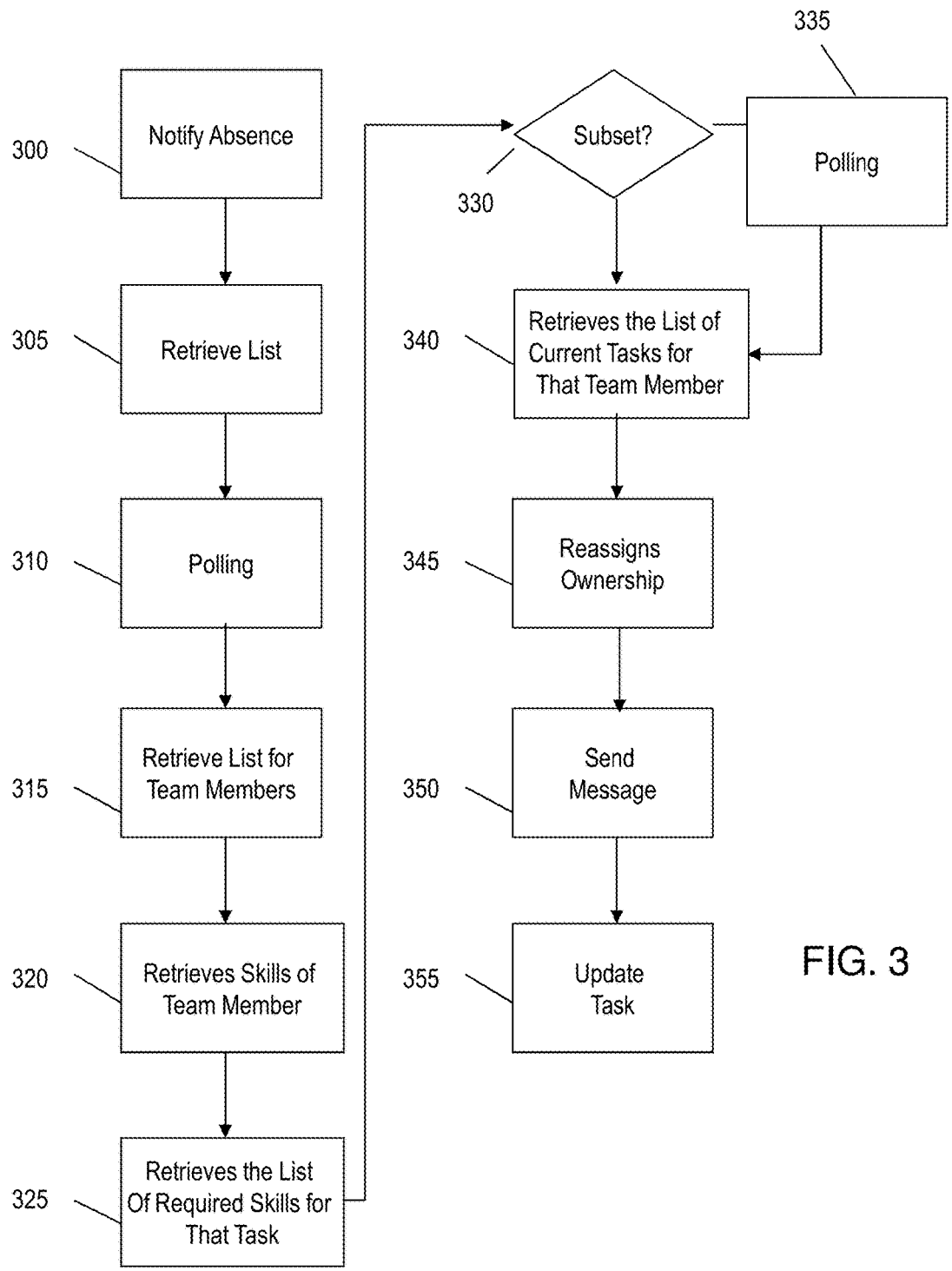
FIG. 3 is a flow-chart of processing steps implementing aspects of the invention.

FIG. 3 is a flow diagram implementing steps of the invention, which may be implemented in the environment of FIG. 1. FIG. 3 may equally represent a high-level block diagram of the invention. The invention can take the form of an entirely hardware embodiment, an entirely software embodiment or an embodiment containing both hardware and software elements. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In FIG. 3, at step 300, the Task Notifier will be notified of the absence of the Project Manager. The Project Manager may, in embodiments, provide this notification when there is a planned absence such as logging off for the evening. At step 305, the Task Notifier retrieves a list of all geographically dispersed resources from the Resources Table in the Task-Resource Database.

At step 310, the Task Notifier polls the Instant Message Application or other application (e.g., via a web service) to determine which geographically dispersed resources are online and/or currently working. At step 315, for each resource (team member) on-line (or working), the Task Notifier retrieves the latest list of tasks from the Tasks Table whose Required Skills column is not null (e.g., a column that has not been completed), and uses its rules engine to sort them by priority.

In one embodiment, the rules engine sorts the tasks in priority from highest to lowest; although, it is contemplated by the invention that the rules engine may prioritize the tasks from lowest to highest. In embodiments, the rules engine comprises a high level code, which allows the Project Manager to update the rules engine at the time of creating, or modifying a task. This may include assigning a higher or lower priority to a task.

At step 320, the Task Notifier retrieves the skills of a team member from the Resources Table. For each task in the retrieved subset of tasks, the Task Notifier retrieves the list of required skills for that task, at step 325. At step 330, a determination is made as to whether the required skills are a subset of the skills of a team member. As should be understood to those of skill in the art, a subset may include an identical match between the required skills and the skill set of a team member. If there is no match, then at step 335, the system will continue to poll the Resources Table until a skill set is matched.

Once a subset is found, at step 340, the Task Notifier retrieves the list of current tasks for that team member from the Change Management Application. If all those tasks are lower in priority than the new task, the Task Notifier reassigns ownership of the new or modified task to the team member, at step 345. In alternate embodiments, the Task Notifier can reassign priority to any current task owned by a team member, regardless of its current priority. At step 350, the Task Notifier sends a message, e.g., Instant Message and/or email, to the team member, notifying the team member of the new or modified task, and its priority. In this step, the team member is notified that they "own" the new or modified task. At step 355, when the team member finishes the assigned task (or any task), the task is updated as normal. In embodiments, the team member may update the status of the task. The steps 310-355 may continue in an infinite loop.

Thus, in embodiments, the system and method of the invention may provide, amongst other features:

A technology for automatically performing functions of a project manager, in the absence of the project manager;

An execution flow for automatically prioritizing tasks for human resources globally dispersed among time zones, and notifying those people that they own new tasks;

A Task Notifier application which includes business logic and which integrates a change management application and an instant messaging application; and A rules engine for prioritizing tasks.

While the invention has been described in terms of embodiments, those skilled in the art will recognize that the invention can be practiced with modifications and in the spirit and scope of the appended claims.

What is claimed is:

1. A computer program product comprising a non-transitory computer usable storage device having readable program code tangibly embodied in the storage device, the computer program product includes at least one component to:

retrieve a list of geographically-dispersed resources belonging to virtual project teams among different time zones to provide a flexibility of bringing together members from diverse contexts for endeavors, wherein a resources table associates each of the geographically-dispersed resources with a respective plurality of skills, the resources table is stored in a database used as a pointer to other storage areas;

poll a message application to determine which of the geographically dispersed resources is online and currently working;

retrieve a list of tasks from a task table by:
  determining that one or more tasks in the task table are associated with a respective plurality of required skills, and
  retrieving the one or more tasks;

determine that a first task of the list of tasks matches a first member of the geographically dispersed resources by comparing the respective plurality of required skills of the first task with the respective plurality of skills of the first member;

retrieve a list of current tasks assigned to the first member;

determine that each of the current tasks in the list of current tasks assigned to the first member is lower in priority than the first task; and reassign ownership of the one of the first task to the first member, wherein:

a low-priority thread of a processor uses an infinite loop to poll a change of management application for a latest list of newly created or modified tasks which are yet to be started and are modified or added to the change of management application by a web service interface; and the at least one component is further operable to add the newly created or modified tasks to the task table by adding rows for the newly created or modified tasks and associate each of the newly created or modified tasks with a plurality of required skills by notifying a user through the message application to complete a required skills column in the tasks table for each row for the newly created or modified tasks, wherein:

the computer program product further includes a rules engine configured to:
  prioritize the plurality of tasks in the list of tasks;
  notify the first member of the geographically-dispersed resources about newly assigned tasks; and
  allow a manager to update the rules engine at the time of the newly created or modified tasks, wherein:

the task table is accessible by the processor;

for each of the tasks, the task table includes an entry corresponding to a Task ID, a Priority, and Required Skills;

the Task ID is a pointer pointing to the change of management application;

the priority value is an integer which designates a priority of a respective one of the plurality of the tasks; and the required skills are a set of skills that are required for a respective one of the plurality of the tasks.

2. The computer program product of claim 1, wherein the message application is an instant message application polled through the web service interface.

3. The computer program product of claim 2, wherein the web service interface interfaces with the change of management application in order for the processor to communicate therewith.

4. The computer program product of claim 1, wherein:
the resources table is accessible by a processor,
the resources table includes a name, a User ID, an Application User ID, and the respective plurality of skills.

5. The computer program product of claim 4, wherein the computer program product includes at least one component configured to add information for any unstarted task that does not have a corresponding task in the tasks table.

6. A system comprising:

a CPU, a computer readable memory and a computer readable storage medium;

program instructions to poll, by a processor through a message application, a list of geographically dispersed resources belonging to virtual project teams among different time zones to determine which geographically dispersed resources are online and currently working to provide a functionality for matching and prioritizing tasks amongst the geographically dispersed resources, wherein a resource table associates each of the geographically dispersed resources with a respective plurality of skills, the resource table is stored in a database used as a pointer to other storage areas;

program instructions to retrieve, by the processor, a latest list of tasks from a task table by:

program instructions to determine that required skills information associated with one or more tasks in the task table is not null; and program instructions to retrieve the one or more of the tasks;

program instructions to prioritize each of the retrieved tasks for selected ones of the geographically dispersed resources by using an architecture having an executable code which implements programmable business logic;

program instructions to notify, by the processor, the selected ones of the geographically dispersed resources of a newly assigned task and its priority;

program instructions to determine, by the processor, that a first task of the latest list of tasks matches one of the geographically dispersed resources by comparing a respective plurality of required skills of the first task with the respective plurality of skills of the one of the geographically dispersed resources;

program instructions to retrieve, by the processor, a list of current tasks assigned to the matched one of the geographically-dispersed resources;

program instructions to determine, by the processor, that each of the current tasks in the list of current tasks assigned to the matched one of the geographically-dispersed resources is lower in priority than the one of the retrieved tasks;

program instructions to reassign, by the processor, ownership of the one of the retrieved tasks to the matched one of the geographically-dispersed resources;

program instructions to use a low-priority thread which uses an infinite loop to poll for a latest list of newly created or modified tasks which are yet to be started;

program instructions to add rows for the newly created or modified tasks to the task table and associate each of the newly created or modified tasks with a plurality of required skills by notifying a user through the message application to complete a required skills column in the tasks table for the newly created or modified tasks; and a rules engine configured to:
  prioritize the plurality of tasks in the list of tasks;
  notify a first member of the geographically-dispersed resources about newly assigned tasks; and
  allow a manager to update the rules engine at the time of the newly created or modified tasks, wherein:

the task table is accessible by the processor;

for each of the tasks, the task table includes an entry corresponding to a Task ID, a Priority, and Required Skills;

the Task ID is a pointer pointing to the change of management application;

the priority value is an integer which designates a priority of a respective one of the plurality of the tasks;

the required skills are a set of skills that are required for a respective one of the plurality of the tasks; and wherein the program instructions are stored on the computer readable storage medium for execution by the CPU via the computer readable memory.

7. The system of claim 6, further comprising prioritizing a new task or tasks assigned to the selected ones of the geographically dispersed resources with a current task.

8. The system of claim 6, wherein the message application is an instant message application polled through a web service interface.

9. The system of claim 8, wherein the web service interface interfaces with a change of management application in order for the processor to communicate therewith.

10. The computer program product of claim 5, wherein the rules engine uses programmable business logic to prioritize the plurality of tasks and notify the first member of the geographically-dispersed resources about newly assigned tasks.

11. The computer program product of claim 10, wherein the Task ID entry of the task table is in the form of a string, the Priority entry of the task table is in the form of an integer and the Required Skills entry of the task table is in the form of a comma-delineated string of skills.

12. The computer program product of claim 11, wherein the User ID in the resources table is in the form of a string, the Application User ID in the resources table is in the form of a string and the respective plurality of skills in the resources table is in the form of a comma-delineated string.

13. The computer program product of claim 12, wherein the first member of the geographically-dispersed resources is notified about the newly assigned tasks by email or facsimile.

14. The computer program product of claim 13, further comprising at least one component to notify an absence of the manager to the at least one component which includes the rules engine.

15. The computer program product of claim 14, wherein the absence is planned.

* * * * *